(12) United States Patent
Downey et al.

(10) Patent No.: US 9,926,132 B2
(45) Date of Patent: *Mar. 27, 2018

(54) CONVERTED INTERMODAL CONTAINER HAVING A FLEXIBLE LINER FOR USE AS A WATER PROCESSING TANK

(71) Applicant: newterra ltd., Brockville (CA)

(72) Inventors: Jason Downey, Manotick (CA); Jeffrey Kempson, Brockville (CA)

(73) Assignee: Newterra Ltd., Brockville, Ontario (CA)

( * ) Notice: Subject to any disclaimer, the term of this patent is extended or adjusted under 35 U.S.C. 154(b) by 0 days.

This patent is subject to a terminal disclaimer.

(21) Appl. No.: 15/347,388

(22) Filed: Nov. 9, 2016

(65) Prior Publication Data
US 2017/0057740 A1  Mar. 2, 2017

Related U.S. Application Data

(63) Continuation of application No. 14/176,134, filed on Feb. 9, 2014, now Pat. No. 9,546,013.

(60) Provisional application No. 61/762,968, filed on Feb. 11, 2013, provisional application No. 61/875,267, filed on Sep. 9, 2013.

(51) Int. Cl.
| | |
|---|---|
| *B65D 6/32* | (2006.01) |
| *B65D 88/12* | (2006.01) |
| *B65D 90/04* | (2006.01) |
| *B65D 90/08* | (2006.01) |
| *B65D 1/40* | (2006.01) |
| *B65D 90/02* | (2006.01) |
| *B65D 81/38* | (2006.01) |
| *B65D 90/10* | (2006.01) |
| *C02F 1/00* | (2006.01) |

(52) U.S. Cl.
CPC ............. *B65D 90/046* (2013.01); *B65D 1/40* (2013.01); *B65D 7/38* (2013.01); *B65D 81/38* (2013.01); *B65D 88/121* (2013.01); *B65D 90/022* (2013.01); *B65D 90/08* (2013.01); *B65D 90/10* (2013.01); *C02F 1/00* (2013.01); *C02F 2201/007* (2013.01)

(58) Field of Classification Search
CPC ........... B65D 21/02; B65D 88/32; B65D 1/40
USPC ........................ 206/335; 220/4.12, 562, 402
See application file for complete search history.

(56) References Cited

U.S. PATENT DOCUMENTS

| | | | |
|---|---|---|---|
| 6,858,138 B2* | 2/2005 | Pattee ................ | B01D 21/0003 210/232 |
| 2010/0025407 A1* | 2/2010 | Benson ................ | B65D 88/022 220/564 |

* cited by examiner

*Primary Examiner* — Anthony Stashick
*Assistant Examiner* — Raven Collins
(74) *Attorney, Agent, or Firm* — Stuart L. Wilkinson

(57) ABSTRACT

An intermodal container having a roof, a floor, side walls and end walls is converted for use as a tank for processing water with the roof, floor, side walls and first end wall forming a roof, floor, side walls and one end wall of a tank. The tank has an opposing end wall fixed to the container side walls, all of the tank walls being reinforced to enable the tank to hold water. A flexible liner tub for containing water to be processed is supported by the floor and mounted against the tank walls and has a margin at a top edge. A liner cap mounted to the roof has a margin at its edge with the liner tub and the liner cap overlapping and sealed to one another at their margins.

11 Claims, 15 Drawing Sheets

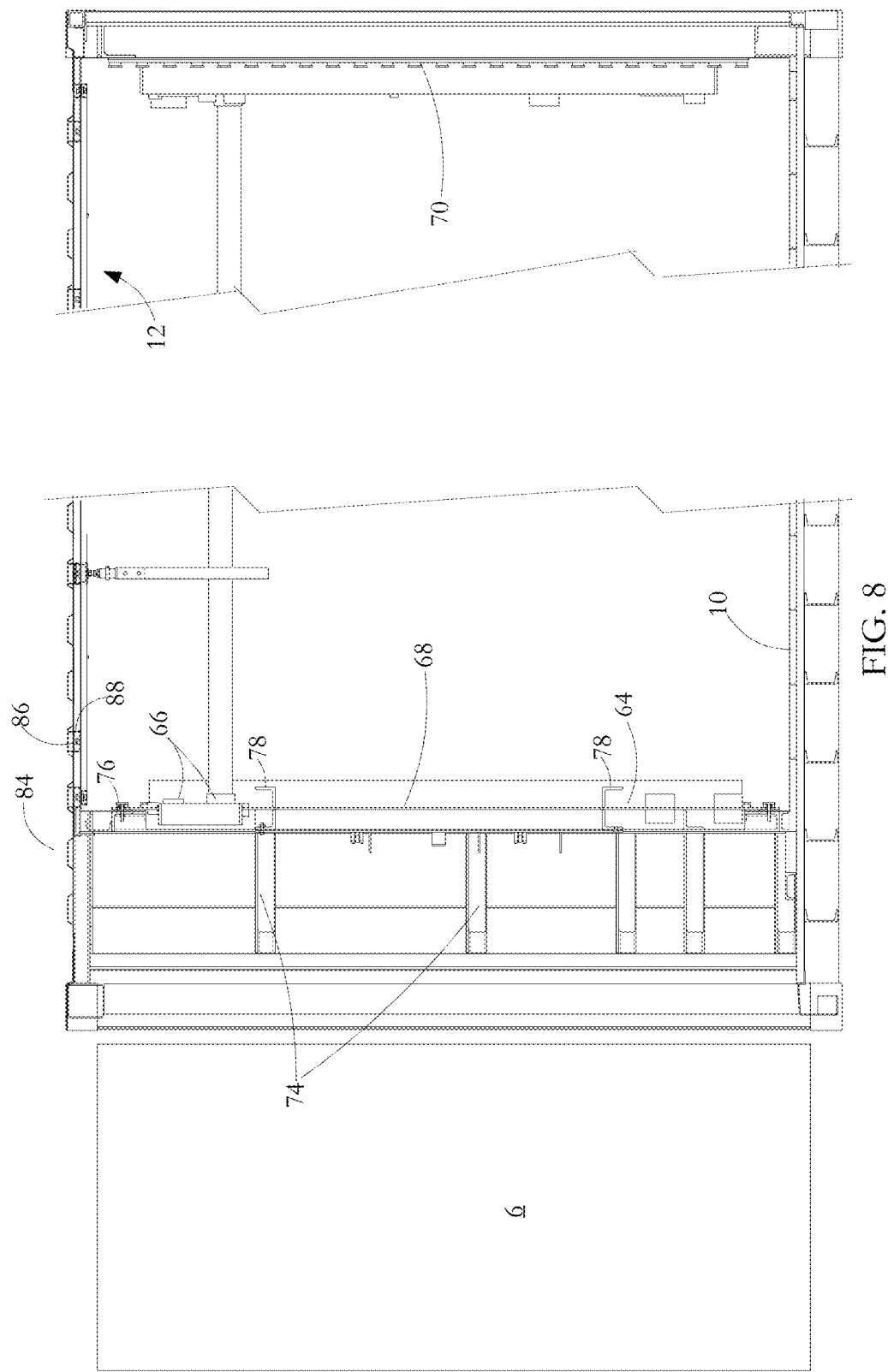

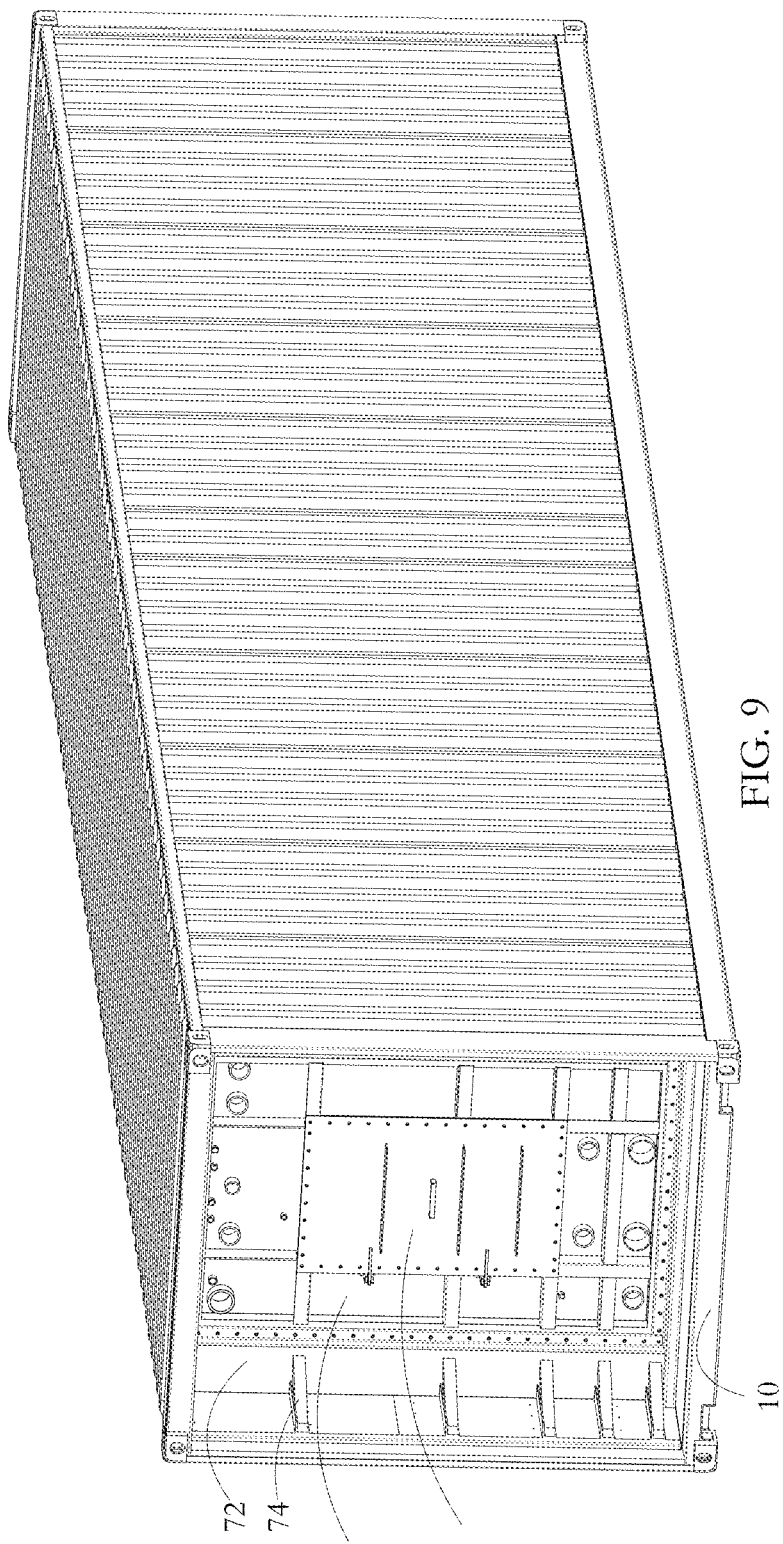

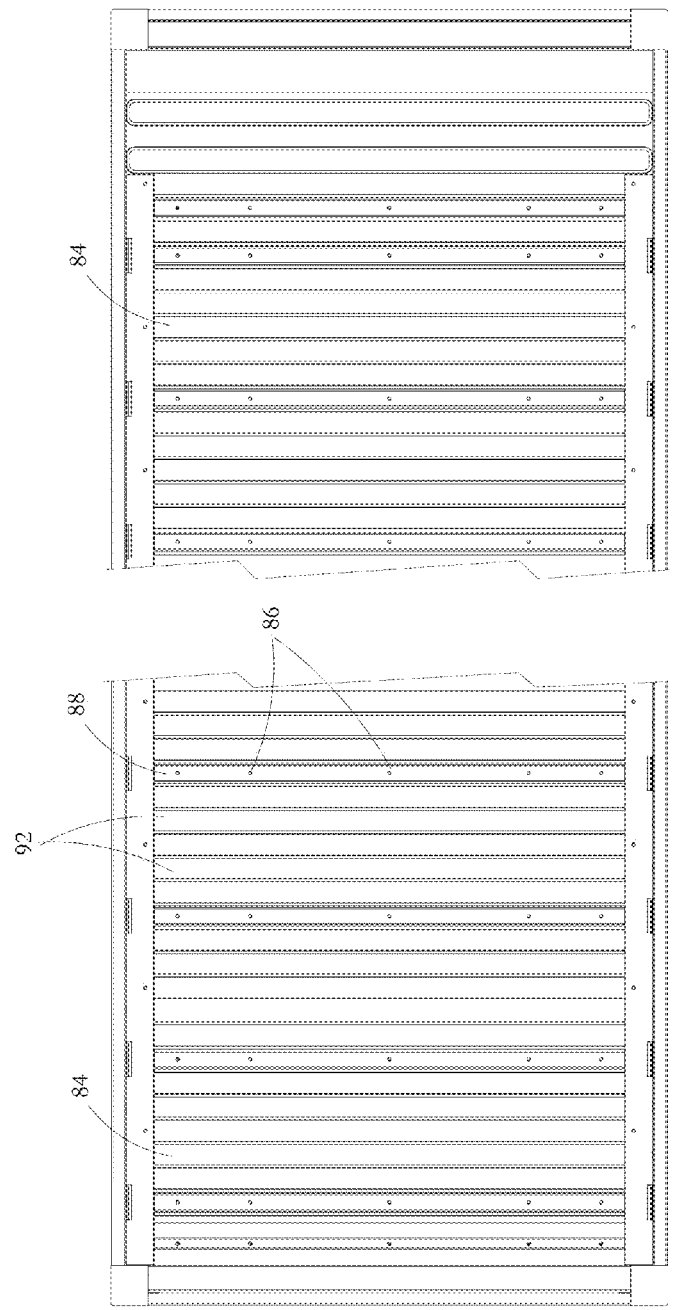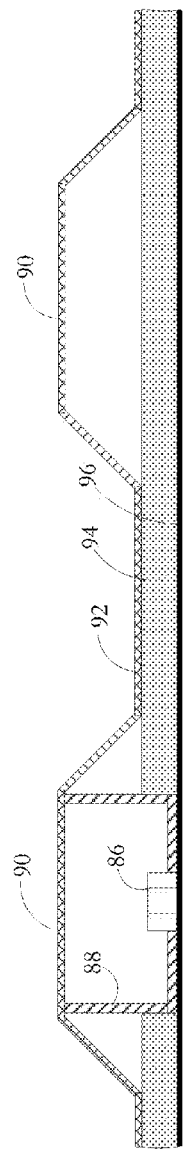
FIG. 12
FIG. 13

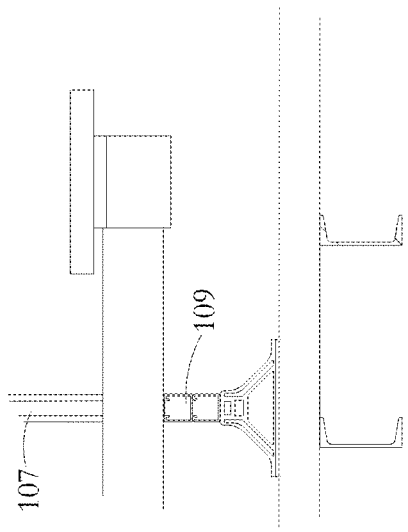
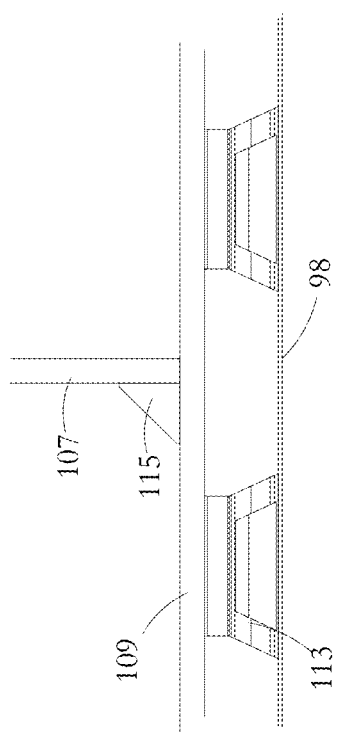

US 9,926,132 B2

CONVERTED INTERMODAL CONTAINER HAVING A FLEXIBLE LINER FOR USE AS A WATER PROCESSING TANK

CROSS REFERENCE TO RELATED PATENTS

The present application is a continuation application of and claims priority from, U.S. application Ser. No. 14/176,134 filed Feb. 9, 2014, entitled "Converted intermodal container for use as a water processing tank", which application claims priority under 35 USC 119(e) from provisional U.S. application 61/762,968 filed Feb. 11, 2013, entitled "Container conversion for water treatment tank" and from provisional U.S. application 61/875,267 filed Sep. 9, 2013, entitled "Method of reinforcing an intermodal container and container so reinforced", the contents of which applications are expressly incorporated herein in their entirety by reference thereto.

FIELD OF THE INVENTION

This invention relates to a method of converting intermodal containers and converted containers obtained thereby. The invention has particular application to converted containers for use in treating wastewater.

DESCRIPTION OF RELATED ART

Water tanks are needed for a variety of purposes in the context of wastewater treatment. Holding tanks are used for storing water before or after it is treated. Equalization tanks are used in processes for dampening large variations in water flow rate or quality. Aeration tanks are used for stimulating aerobic breakdown of contaminants in wastewater. Membrane bioreactor (MBR) tanks are used to remove contaminants during or after aeration. Settling tanks are used to remove heavier than water solids. Filtration tanks are used for filtering wastewater. Air/water tanks, in which counter-currents of air and water are flow over packing material, are used for air stripping of volatile contaminants or for cooling and evaporation.

There is a requirement for easily portable tanks that can be partly or fully pre-fabricated and shipped to deployment sites. The requirement for transporting in conventional intermodal container sizes places limitations on the length, footprint area and height of prefabricated mobile units. It has been proposed that an intermodal container itself be used as the basis for the manufacture of a water treatment tank. A typical intermodal container (also called shipping container, freight container, ISO container, hi-cube container, box, conex box and sea can) is a standardized reusable steel box used for the storage and movement of materials and products within a global containerized intermodal freight transport system. External lengths of containers, which each have a unique ISO6346 reporting mark, vary from 8 feet (2.438 m) to 56 feet (17.07 m) with the most common lengths being 20 feet and 40 feet. Heights of containers compliant with ISO 6346 are from 8 feet (2.438 m) to 9 feet 6 inches (2.9 m). Widths are generally 8 feet.

Known methods for converting standard shipping containers having walls made of corrugated weathering steel or like materials for use in water treatment facilities have not proven satisfactory.

SUMMARY OF THE INVENTION

According to an aspect of the invention, there is provided an intermodal container having a roof, a floor, side walls and a first end wall, the container converted for use as a tank for processing water with the roof, floor, side walls and first end wall forming a roof, floor, side walls and first end wall of a tank, the tank having a second end wall opposed to said first tank end wall and fixed to the container side walls, the tank walls reinforced for enabling the tank to hold water to be processed, a flexible liner for containing the water to be processed, the liner supported by the floor and mounted against the tank walls, one of the tank walls having a first aperture therein with a first margin part of said one tank wall bounding said first aperture formed with a first flange surface facing into the interior of the tank, the liner having a second aperture therein corresponding in position to the position of the first aperture, and a first process wall detachably mounted to the first flange surface, with a second margin of the flexible liner bounding the second aperture sandwiched between a first boundary part of the mounted first process wall and the first flange surface, and a first plurality of interface components mounted and sealed at ports in the first process wall to provide inputs to, and outputs from, the tank interior.

BRIEF DESCRIPTION OF THE DRAWINGS

For simplicity and clarity of illustration, elements illustrated in the following figures are not drawn to common scale. For example, the dimensions of some of the elements are exaggerated relative to other elements for clarity. Advantages, features and characteristics of the present invention, as well as methods, operation and functions of related elements of structure, and the combinations of parts and economies of manufacture, will become apparent upon consideration of the following description and claims with reference to the accompanying drawings, all of which form a part of the specification, wherein like reference numerals designate corresponding parts in the various figures, and wherein:

FIG. 8 is a vertical sectional view through a reinforced intermodal container showing, according to an embodiment of the invention, process wall arrangements at each end of the container.

FIG. 9 is an isometric view of the process wall of FIG. 5 showing the process wall installed at one end of a converted intermodal container according to an embodiment of the invention.

FIG. 12 is a view from below of the roof of a converted intermodal container showing locations of suspension assemblies according to an embodiment of the invention.

FIG. 13 is a detail vertical sectional view showing a part of a converted intermodal container roof and an upper part of a suspension assembly according to an embodiment of the invention.

FIG. 23 is a detail view of the base of the support arrangement of FIG. 21 from one end.

FIG. 24 is a detail view of the base of the support arrangement of FIG. 21 from one side.

DETAILED DESCRIPTION OF THE INVENTION INCLUDING THE PRESENTLY PREFERRED EMBODIMENTS

Figure 1:
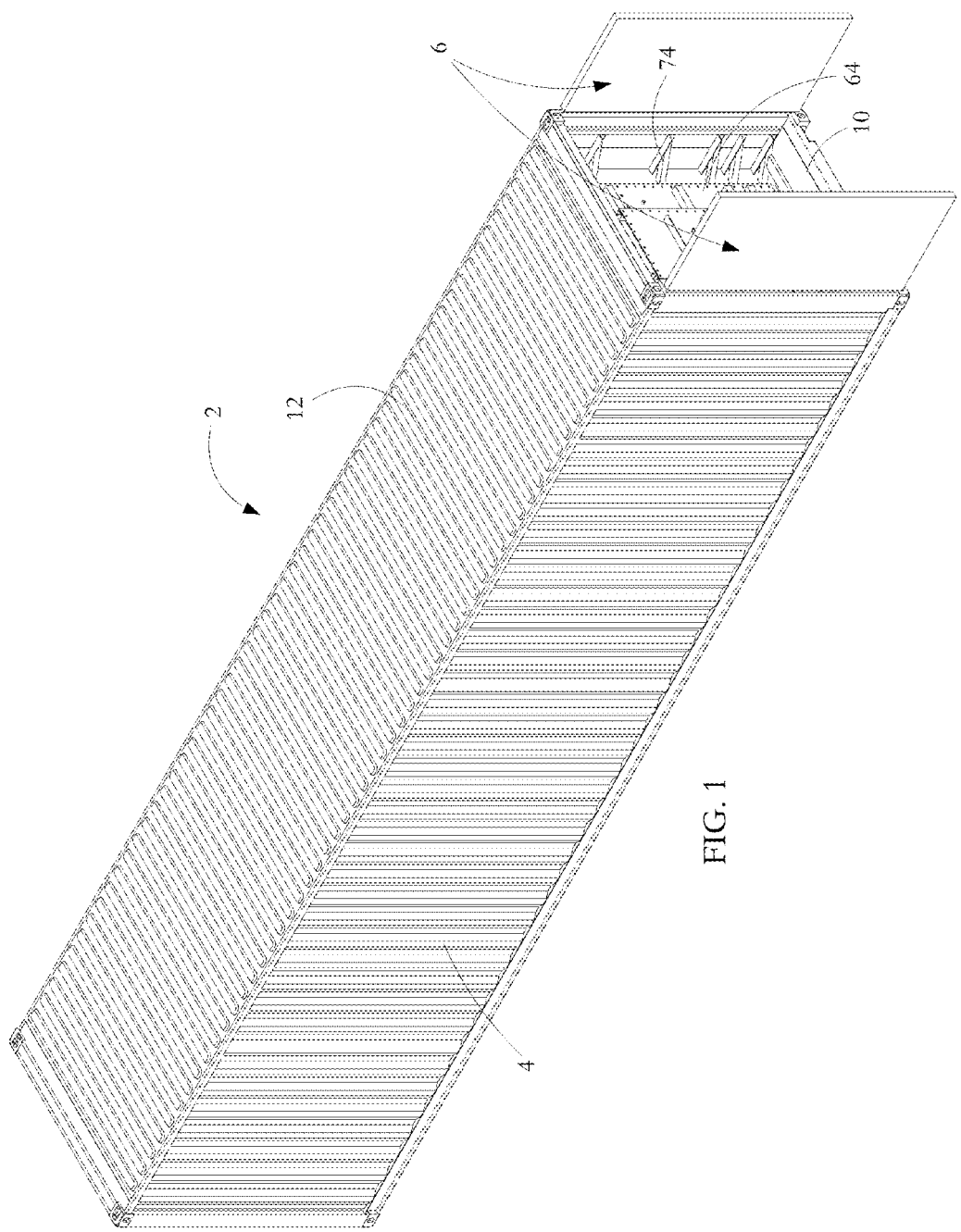
FIG. 1 is an isometric view from the front and one side of a converted intermodal container according to an embodiment of the invention.
Figure 2:
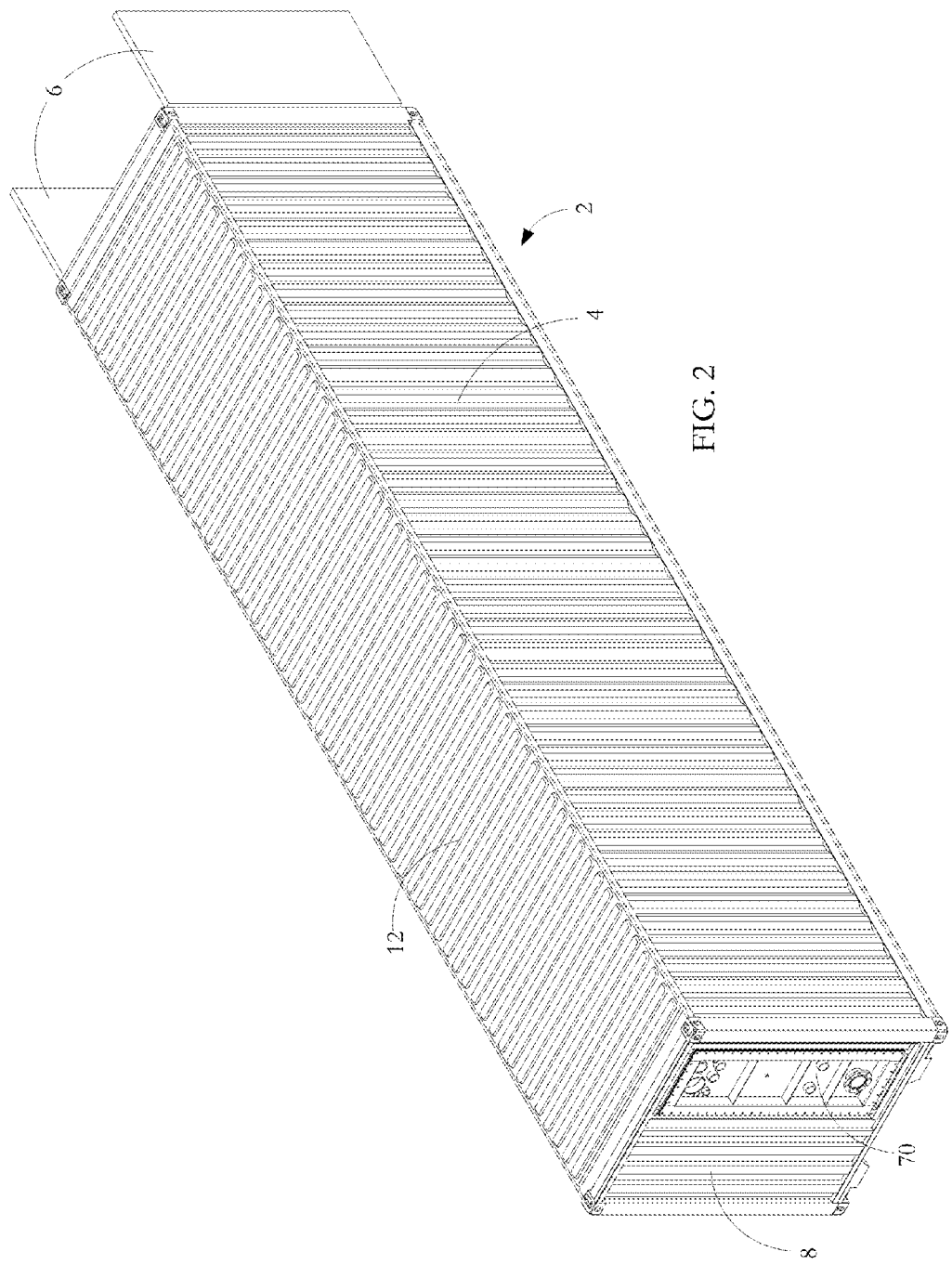
FIG. 2 is an isometric view from the rear and the other side of the converted intermodal container of FIG. 1.

As shown in the isometric illustrations of a reinforced intermodal container 2 in FIGS. 1 and 2, the container is basically a box made from weathering sheet steel having side walls 4, end doors 6, a rear wall 8, a floor 10 and a roof 12. Such containers are also known as shipping or freight containers and are conventionally used for the storage and movement of materials and products within a global containerized intermodal freight transport system. "Intermodal" indicates that the container can be moved from one mode of transport to another (e.g. from ship, to rail, to truck) without unloading and reloading the contents of the container.

Under ISO 6346 standard, the length of a container may be any of a range of external lengths each corresponding to an ISO 6346 reporting mark. Such lengths may vary from 8 feet (2.438 m) to 56 feet (17.07 m) with the most common lengths being 20 feet and 40 feet. Heights of containers compliant with ISO 6346 are from 8 feet (2.438 m) to 9 feet 6 inches (2.9 m). Widths are generally 8 feet.

Figure 3:
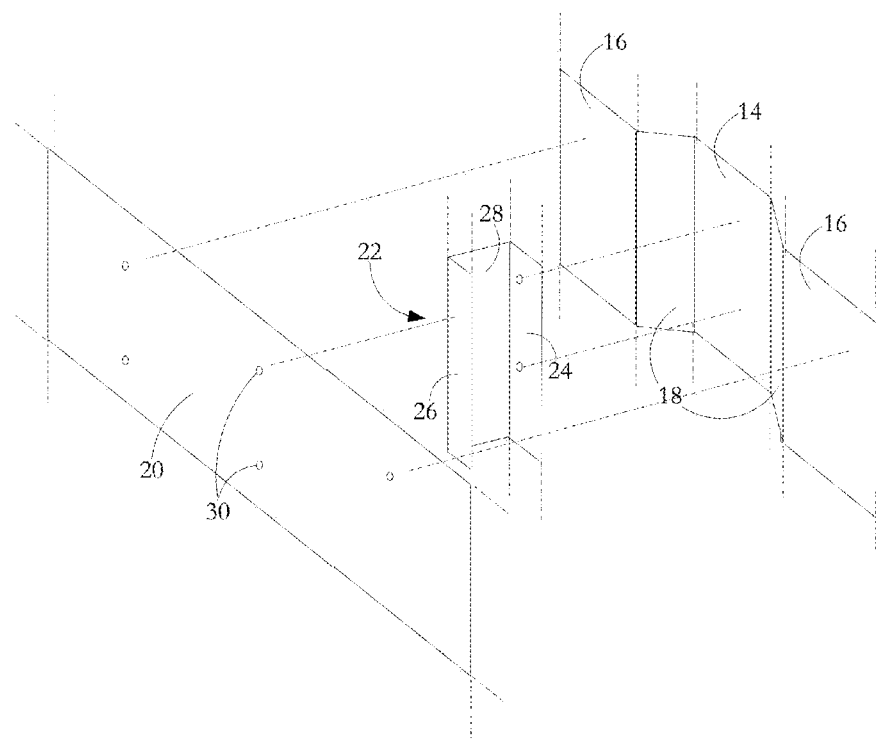
FIG. 3 is an exploded isometric view of part of a reinforcing arrangement according to an embodiment of the invention and used in a converted intermodal container.
Figure 4:
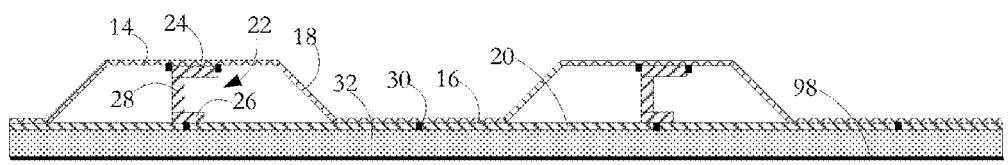
FIG. 4 is a horizontal sectional view of the reinforcing arrangement of FIG. 3.

As shown in the detail isometric view of FIG. 3 and the detail sectional view of FIG. 4, container walls are made of corrugated weathering sheet steel having a thickness of the order of a sixteenth of an inch. The walls have in sequence along their length, alternating outboard and inboard panels, respectively 14 and 16, each outboard panel integrally joined to its adjacent inboard panels by sloping web portions. The panels extend from the bottom to the top of the intermodal container. While the corrugated wall formation provides some strength against lateral and vertical forces, if an unreinforced container is filled with water, the corrugation simply expands like an accordion. The walls are then incapable of offering resistance to the lateral forces imposed by the contained water and the container will consequently bow outwards and burst. FIGS. 3 and 4 show one configuration for reinforcing a container wall so that the container may be used for processing water or other liquids.

Referring in detail to FIGS. 3 and 4, there is shown part of the wall of a reinforced intermodal container. The wall is reinforced by welding a reinforcing structure to the inside of the wall, the reinforcing structure including a sheet steel panel 20 having a thickness of the order of one eighth of an inch and channel form stiffeners 22 made of cold-formed steel plate of the order of quarter inch in material thickness. The channel member 22 has walls 24, 26 bridged by flange 28. The channel members 22 are welded to each outboard panel 14 with a wall 24 of each channel member flat against the interior surface of an outboard panel 14 of the container wall. The width of flange 28 is such that the walls 26 and the inboard panels 16 of the corrugated container wall are essentially coplanar and so form a platform to which the sheet steel panel 20 is fixed. The sheet steel panel 20 is welded to the walls 26 of the channel members 22 after the channel members have been welded to the outside panels and is also welded to the interior surfaces of the inboard panels 16. Walls 24 of the channel members 22 extend further from the respective flanges 28 than walls 26. The disparity in height of the two channel member walls 24, 26 facilitates bending in the course of a cold forming process for manufacturing the channel members 22. Having the high wall 24 positioned against the outboard panel 14 strengthens the outboard panel and also makes it easier to weld because the presence of the smaller wall 26 does not materially inhibit access when the wall 24 is being welded to the outboard panel 14.

Each channel form stiffener is welded in a position laterally at the center of the associated outboard panel 14 by means of a fillet weld at its base and a series of button or plug welds through spaced 5/16" diameter circular apertures in walls 24 of the channel members. The sheet steel panel is welded to the channel members 22 and the inboard panels 16 throughout its height by a series of button welds made at quarter inch diameter circular apertures 30 in the panel 20, the button welds spaced from the floor by distances of 2, 12, 30, 54, 78 and 102 inches, the smaller spacing at the bottom being to combat higher stresses at the bottom of the container when it is full. Button welds are an important structural element of the intermodal container conversion because they provide a controllable technique offering good penetration to the corrugated container wall while providing a reduced risk of burn damage compared with other welding techniques. The preferred welding process is MIG welding in spray mode with a 0.035 mm metal core wire, a Praxair® MIG MixGold™ Gas (argon/CO$_2$ mix), a 350 wire feed speed, and 24V setting. These conditions consistently provide a full penetration weld without burning through the outside wall. Clearly, different welding techniques and materials can be utilized to achieve wall reinforcement using the panels 20 and channel members 22 as described. It is desirable however, to use a process and materials to obtain a strong welding pattern quickly and without burning through the outer wall of the intermodal container.

For supply convenience, the sheet steel panel 20 is formed from two panels each 4 to 5 feet in width laid on edge so that together they span an eight foot height plus interior height of the intermodal cube container. Spacing between edges of adjacent areas of steel panel, whether horizontal or vertical, is made as small as possible and certainly less than 2 inches. This is important because when the intermodal container is used as a liquid container, for some installations, an inch thick insulating polystyrene layer 32 is fixed by adhesive to the inner face of the reinforcing sheet steel panels and then a flexible, liquid-tight liner 34 is arranged over and secured by adhesive foam caulking to the insulating layer 32. The pressure of liquid in a full tank or container is so high that if the gap between adjacent sections steel panel 20 is too large, the pressure of the contained liquid would deform and press the liner 34 and insulating layer 32 into the gap and possibly damage one or both of the liner and insulation. If no insulation layer is required, it is still important that the panels are fitted closely together to minimize the chance of liner damage. In this case, the liner is attached directly to the steel wall with seams being taped to protect the liner from any sharp edges. In this case, the panel to panel space is preferably less than a quarter inch.

It will be seen that the method for reinforcing an intermodal container wall adds strengthening material only to the inside of the container, with the outside dimensions of the container remaining unchanged after the reinforcing is complete. This means that, after reinforcing, the container continues to meet the outside dimensional requirements of the ISO 6346 standard for that length of container. The internal width of the container wall is reduced by only a small amount. The illustrated strengthening structure has flanges extending at substantially 90 degrees to the general plane of the intermodal container wall, the flanges joining outboard container panels to inboard flat members which are joined to the inboard container panels. Compared to the unreinforced walls, this container wall structure is considerably less prone to bending when the container is filled with water. It will be appreciated that the reinforcing structure can be altered somewhat without compromising the reinforcing properties and while using the principles inherent in the illustrated design.

Figure 7:
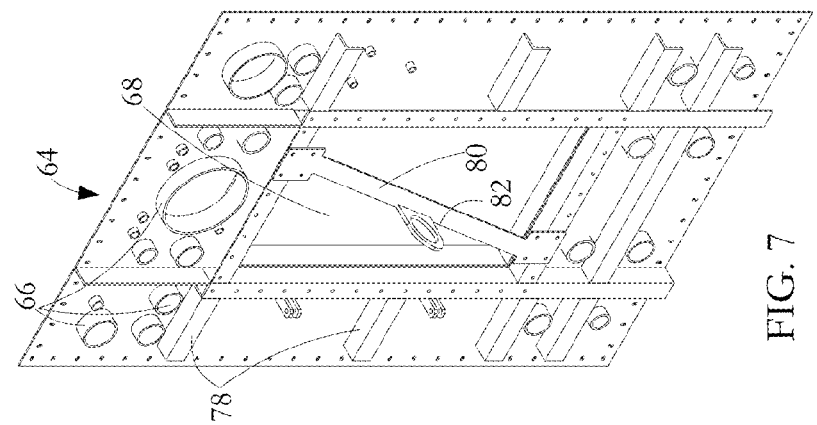
FIG. 7 is an isometric view of the process wall of FIG. 5.
Figure 6:
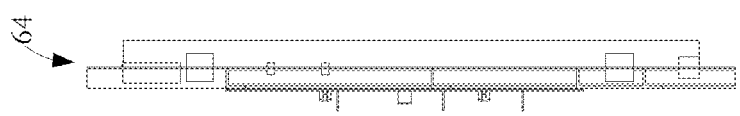
FIG. 6 is a side view of the process wall of FIG. 5.
Figure 5:
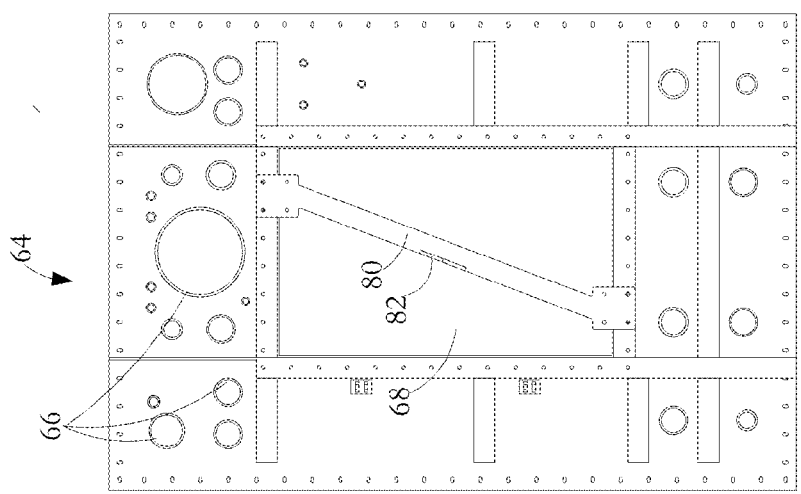
FIG. 5 is a front view of a process wall for installation in a reinforced intermodal container end wall according to an embodiment of the invention.

As indicated previously, a converted intermodal container is used as a processing tank for storing or treating water. Processing may take any of a number of forms depending on the nature of the untreated water input and the desired nature of the treated water output. Such processing predominantly occurs inside the tank but requires inputs to the tank and outputs from the tank. In one embodiment of the invention, as illustrated in FIGS. 5 to 7, interface components for the tank inputs and outputs are mounted and sealed at ports in a process wall 64. The inputs and outputs include, but are not limited to, any of air lines, visual and electronic monitoring, cleaning ports, motors, sensors, power sources, power cables, communication cables, piping, viewing access, sampling access, vent access, solid effluent extractor, and access hatches. Particularly for servicing processing equipment below the design level of water to be processed in the container tank, the ports are located at a lower level in the process wall. Particularly for routing communication and power cables, ports are located at a process wall upper level. In this specification, components that are used in water processing and need an interface with the water being stored or treated are generally referred to as process components. Components that are used in providing communication and power to the tank interior are generally referred to as utility components.

Referring in detail to FIGS. 5 to 7, the process wall 64 is located at the front end of the converted container tank, where water to be treated enters the tank. A corresponding process wall is sited where treated water exits the tank at the back wall of the tank. This arrangement is convenient for plants in which several container tanks are deployed as a "train" with each tank functioning as one module of the site processing operations. Communication/power cabling and piping run into the front end and out of the back end of an upstream container tank so that downstream tanks in the train can be serviced by common systems. It will be appreciated that a process wall or walls can be installed at other locations such as the top wall of the container tank. Furthermore, whereas in a train of tanks, it may be convenient to site process and utility components at separate input and output process walls, inputs and outputs for a particular processing equipment can alternatively be located at a single process wall, with the associated processing equipment configured as a circuit in the container tank.

The process wall 64 of FIGS. 5 to 7 is designed to be installed near the front end of the container tank as shown in FIGS. 8 and 9. The process wall 64 has side panels 65, a hinged, outwardly swinging manual access hatch 68, and ports 66 to enable mounting of components forming elements of the servicing and processing sub-systems. At the rear end of the container, an area of the end wall 8 is used for accommodating corresponding components for "through" services and for providing a rear manual access hatch 70. A standard intermodal container is modified as illustrated with respect to FIG. 8 to enable attachment of the process wall 64. The standard container has two floor-to-roof doors 6 in its front end enabling loading and unloading of the container. In the modified intermodal container shown in FIG. 9, stub walls 72 are welded to the container sidewalls, floor and roof to create a bulkhead structure about 12 inches along the container sidewall from the doors 6. The junction of the stub walls 72 with the container side walls 4 are strengthened by compression ties 74. The bulkhead structure defines a process wall aperture at which a flange 76 faces into the interior of the container tank, the flange having bolt holes for attachment of the process wall. The process wall has an edge region having bolt holes for alignment with holes in the flange to enable the process wall to be bolted to the flange using outwardly extending bolts 65. The process wall 64 is made from quarter inch thick carbon steel or on eighth inch thick stainless steel and has angle bar strengthening as shown at 78 to combat pressure of water in the filled container tank. It is set in place from inside the container tank. The process wall 64 can be removed as a single structure to enable access to the interior of the tank, when emptied, for repair and servicing if such repair and servicing cannot satisfactorily be achieved using the access hatch 68.

Figure 10:
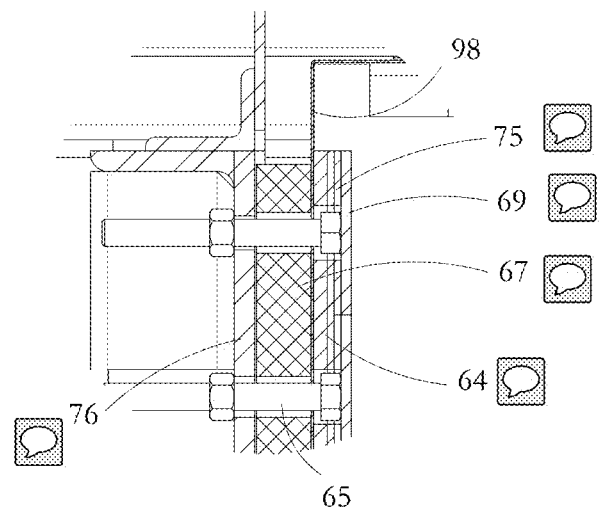
FIG. 10 is scrap sectional view showing the manner of attachment of the process wall in the converted intermodal container according to an embodiment of the invention.
Figure 11:
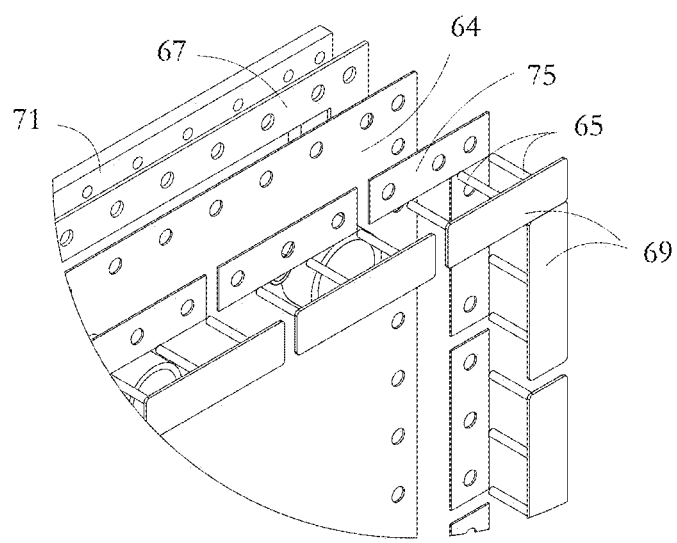
FIG. 11 is a detail exploded view showing the manner of attachment of the process wall in the converted intermodal container according to an embodiment of the invention.
Figure 14:
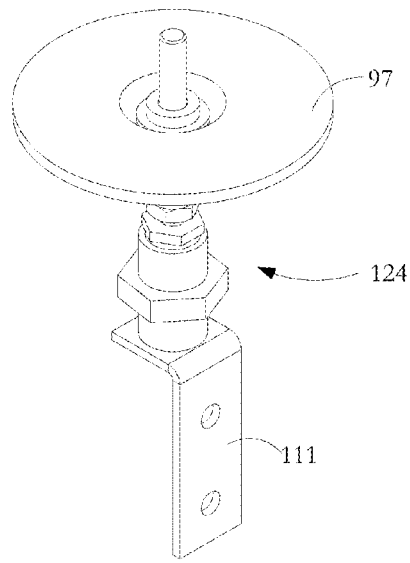
FIG. 14 is an isometric view of part of a lower part of a suspension assembly according to an embodiment of the invention.
Figure 15:
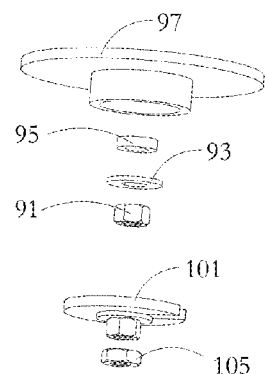
FIG. 15 is an exploded isometric view showing elements of the suspension assembly part of FIG. 14.
Figure 16:
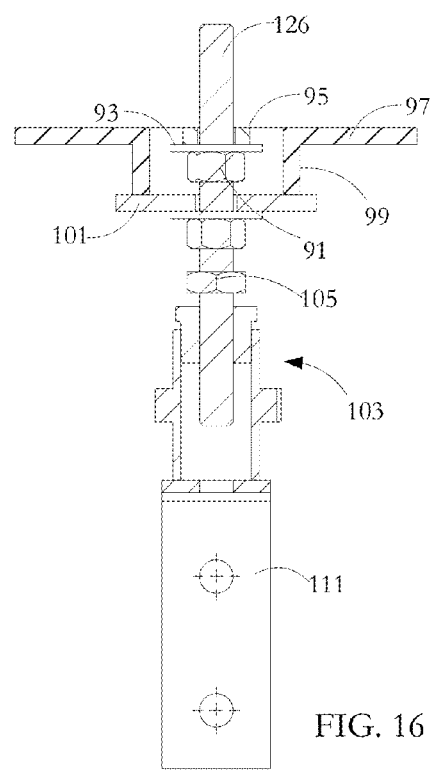
FIG. 16 is a vertical sectional view of the suspension assembly part of FIG. 14.
Figure 17:
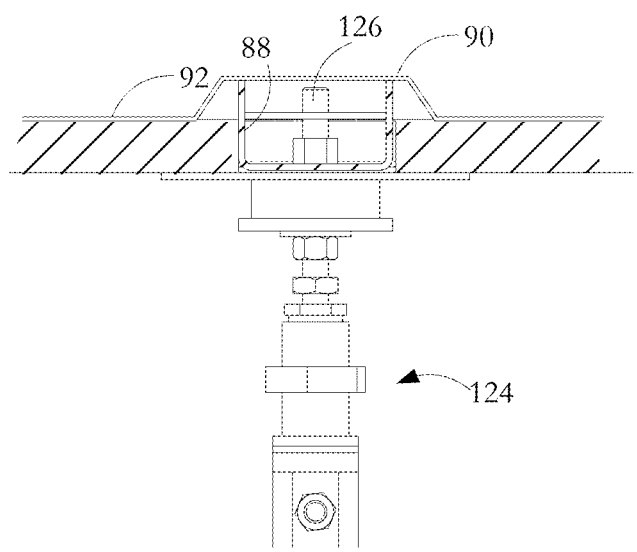
FIG. 17 is a part section view of a suspension assembly according to an embodiment of the invention.

It is important that the flexible liner 34, to be described in detail presently, is effectively sealed, both over the full extent of the liner and where the liner tub part terminates at the process wall 64. The latter is achieved by sandwiching a perimeter strip of the liner between the process wall 64 and the flange 76. As can be seen in FIGS. 10 and 11, the mounting for the process wall 64 is designed with the object of preventing leakage from the container tank. On the inside of the process wall 64 are a gasket 67 and, optionally, a paired one inch thick polypropylene spacer 71 and polyvinyl chloride sheet outside liner 73. The optional secondary liner 73 is installed against the container walls and provides secondary leakage protection for the tank in the event the polypropylene liner 34 were to fail as a result, for example, of the liner being accidentally punctured. The spacer 71 provides one inch of insulation between the inner and outer liners 34, 73 in those installations where there is such an outer liner. With the foam spacer layer 71 and the polyvinyl chloride sheet secondary liner 73, the chance of water leakage to the outside of the converted container is minimized. On the outside of the process wall 64 are a gasket 75 and series of protective steel plates 69, the backs of which are welded to the heads of underlying bolts 65, the plates 69 acting to prevent leakage through the bolt threads.

To enable easy installation of the process wall 64, a diagonally extending bar 80 is attached to the outside of the process wall with a hook 82 at the balance point of the wall. This enables the process wall 64 to be suspended by a crane arm, carried into the interior of the container tank, and then manually manoeuvred into a position where it can be bolted into place without the need to expend significant force. It is important that the process wall is manoeuvred without tearing the flexible liner 34 which would be a risk if the wall has to be moved by manual lifters working inside the container tank. An aperture in the rear wall 8 is similarly configured with a flange to allow installation in a similar manner of a smaller process wall containing an inspection hatch and service/process components.

Certain processing equipment may, in operation, be immersed in the tank water and for such processing equipment, associated process components such as sensors and inspection ports may be mounted at a process level so that they interface with the water in the tank. Other services such as communication and power do not need a direct interface with the contained water and are mounted away from the water contained in the tank.

Processing of water in the tank may be any of a number of forms depending on the nature of the untreated water input and the desired nature of the treated water output. Processing equipment in the tank interior may include, but is not limited to, any of bubbling equipment, scrubbing equipment, clarifying equipment, stripping equipment and mixing equipment, although it will be understood that a converted intermodal container according to one embodiment of the invention can be used simply for water storage in which case there may be no interior processing equipment. The equipment may include, but is not limited to, any of units and/or structures such as submersible pumps, stripping packing media, tubular media for clarification, air bubblers, venture mixers, diffuser piping, distributors and platforms for supporting packing.

In known heavy duty carbon steel tanks, the processing equipment is supported on heavy duty support members that are welded to the tank walls. In the present invention, because a flexible liner is used, welding interior supports to the fabric of the tank is not acceptable because it would require the liner to be punctured at a number of places with some of the puncture sites being below the design level of water to be stored or processed in the tank. This, in turn, would require expensive sealing arrangements and would entail a high risk of leakage. It is important that the flexible liner is not punctured either during manufacture of the tank or, later, during provisioning, transport and deployment for water treatment.

Various embodiments of support arrangements are shown in FIGS. 12 to 24. Each of the support arrangements includes a suspension assembly 124 as shown in greater detail in FIGS. 12 to 17. The assemblies 124 are used without material adaptation or addition to suspend relatively lightweight components such as communication and power cables. The suspension assemblies are also used, in combination with support assemblies which engage the floor of the converted intermodal container tank, to support heavy processing equipment within the water. Embodiments of such heavy duty support arrangements are illustrated in FIGS. 18-24.

Referring in detail to FIGS. 12 and 13, there is shown the roof 12 of a converted intermodal container, the roof formed with a stamped pattern of corrugations 84. Threaded nuts 86 are welded at apertures formed in reinforcing channel bars 88 and the bars are then welded at locations to outboard panels 90 of a number of the corrugations 84. The reinforcing bars 88 project of the order of one inch downwardly beyond the plane occupied by the inner surfaces of inboard corrugation panels 92 of the container roof 12. By fitting the reinforcements at the outboard panels 90, strong joists are provided without materially affecting the inside intermodal container shipping height. One inch thick insulation 32 is then applied to the roof 12 except at the positions of the reinforcing bars 88 to bring the roof to a common level for subsequent application of a liner cap part 96. Certain of the nuts 86 provide anchor points for attaching and supporting the liner cap part 96 at special gasket assemblies as shown in FIGS. 14-17. Other of the nuts are used to suspend threaded bolts 126 forming part of suspension assemblies as shown in FIGS. 14-17.

While other forms of reinforcing element can be welded to the top wall of the intermodal container, the channel bar illustrated is preferred as it extends across the full length of the container top wall enabling even positioning of the liner anchor points across the top wall and permitting mounting of suspension assemblies at selected positions in the converted intermodal container tank.

In each suspension assembly, a suspension bolt 126 is first screwed up into, and anchored at, one of the nuts 86. The nut and bolt combinations can be configured to provide any of several functions. All of the nut 86 and bolt 126 combinations are used to support the liner cap part 96 from the top wall. Secondly, some of the nut 86 and bolt 126 combinations provide a securing mechanism for use in making a seal between a liner tub part 98 and a liner cap part 96 as will be described with respect to FIG. 27. Thirdly, some of the combinations can be part of suspension assemblies 124 used for supporting heavy processing equipment at selected locations and depths in the tank. Finally, some of the combinations can be part of suspension assemblies incorporating brackets tailored for supporting relatively lightweight components such as communication and power cabling, piping, etc., within a top region of the converted container.

Figure 19:
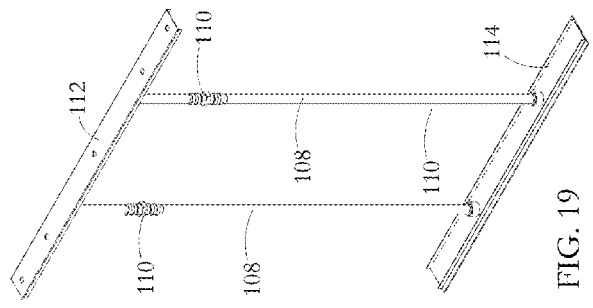
FIG. 19 is an isometric view of part of the support arrangement of FIG. 18.
Figure 20:
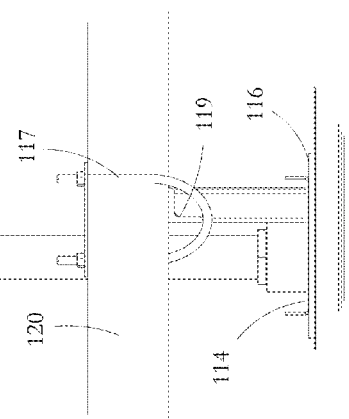
FIG. 20 is a detail view of the base of the support arrangement of FIG. 18.
Figure 18:
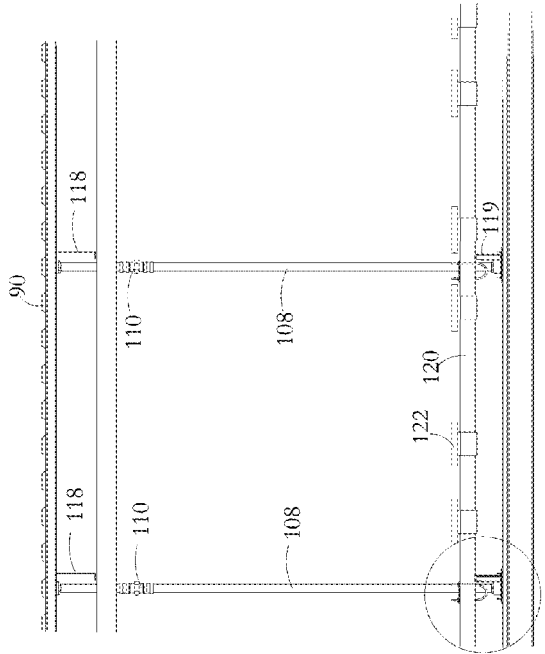
FIG. 18 is a side view of one form of a converted intermodal container support arrangement according to an embodiment of the invention.
Figure 22:
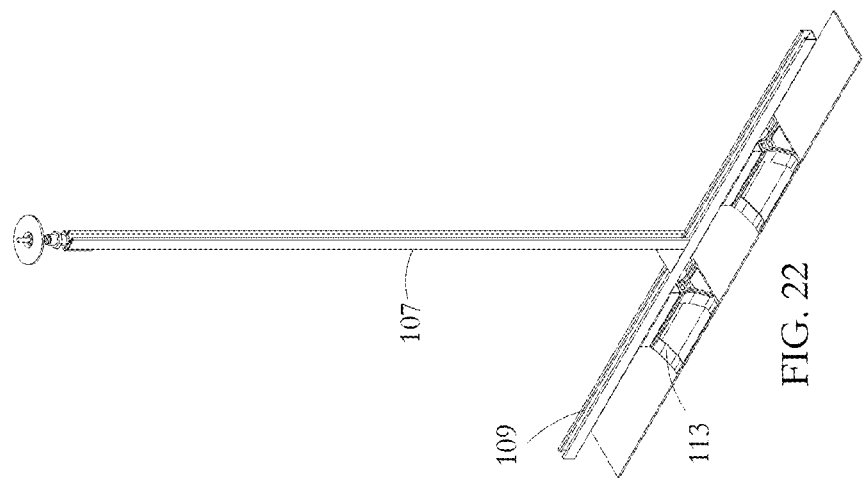
FIG. 22 is an isometric view of part of the support arrangement of FIG. 21.
Figure 21:
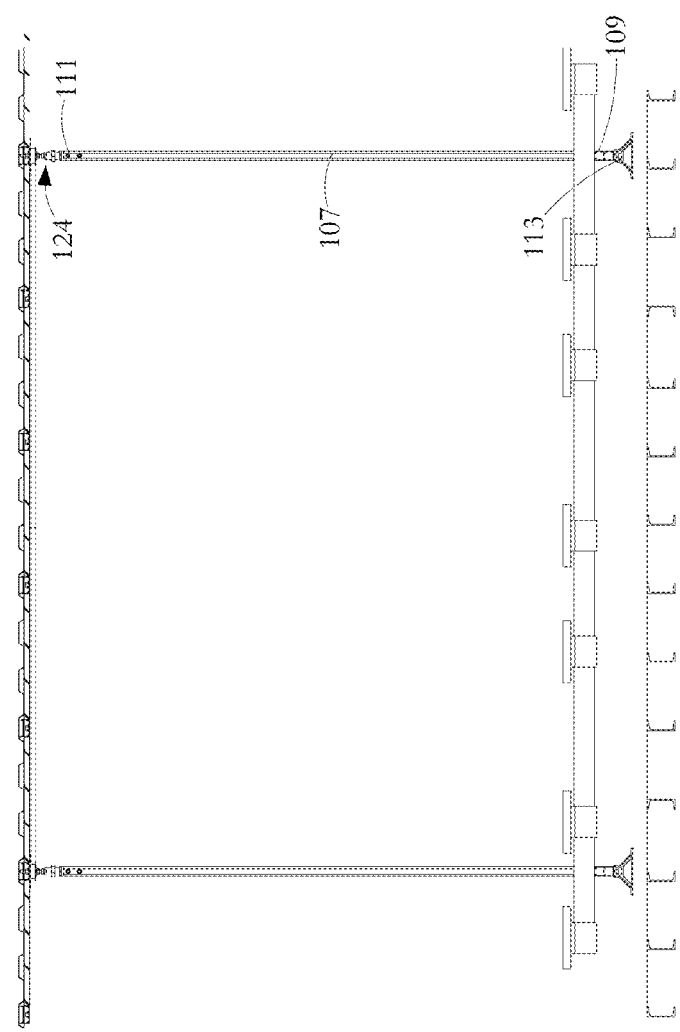
FIG. 21 is a side view of another form of a converted intermodal container support arrangement according to an embodiment of the invention.

One form of suspension assembly as illustrated in FIGS. 12 to 17 has the central bolt 126 clamped against the liner cap part 96 and the reinforcing bar 88 by a lock nut 91, washer 93 and gasket 95. A circular plate 97 with depending annular flange 99 is placed over the anchored bolt 126 so that the plate 97 bears against the surrounding part of the liner cap part 96 and the reinforcing bar 88. A slotted plate 101 is slid from the side over the exposed part of the bolt 126 and is bolted against the flange 99. A lower element of the suspension assembly has a reducing union 103. The reducing union 103 is screwed onto the threaded stud 126 to a desired vertical position and is then locked in position with locknut 105. The lower part of the suspension assembly 124 is adapted for use with a support arrangement, alternative forms of which are shown in FIGS. 18 to 20 and in FIGS.

21 to 24. In use, when the union 103 is turned, it threads onto the stud 126 and moves down, applying a compressive load on the bracket 111 providing a rigid support.

As an alternative to the nuts 86, the reinforcing bar can be formed with a horizontal section with areas of relatively increased thickness, the thicker sections being bored and internally threaded to provide direct anchor points in the reinforcing bar 47 for installation of suspension assemblies 124. Other forms of roof fixtures for the suspension assemblies are possible. In one alternative, a spring biased clamping mechanism (not shown) can be used having an upper fixture member with spring-actuated clamping elements mounted to the reinforcing bars above an entrance aperture in the bars. The lower fixture member is a cylindrical stud having a lower threaded part and an upper wider part shaped to cooperate with the spring clamping members. At installation, the lower fixture member is pushed up through the entrance aperture to force the clamping elements apart until the stud reaches a locking position at which the clamping elements are forced back towards each other by the spring action to clamp the stud in position. The wider part of the stud can for example be the shape of a ball with the clamping elements presenting a claw-shaped holder.

A suspension assembly of the form shown in FIGS. 12 to 17 can be used to support relatively lightweight components that are housing in the interior of the tank but are above the design level of water to be contained in the tank. Examples of such lightweight components include communication and power cables which, in conventional water treatment tanks, are normally taken along the exterior of the tank. This presents a problem in converted intermodal containers if it required that the container be shipped in a state in which the outside dimensions are compliant with the relevant ISO 6346 standard.

In a converted tank according to an embodiment of the invention, the provisioned tank has a duct 87 (FIG. 8) suspended near the top wall by a series of the suspension assemblies 124. The duct 87 supports utilities such as communication and power cables so that the cables run from the process wall at the front of the tank, through the tank to the process wall at the other end of the tank. The duct housing prevents the utility cables from being exposed to water or vapor from the interior of the tank. If warranted, the duct can have multiple internal chambers to avoid electrical interference between the cables or the cables can be run through more than one duct. When the provisioned converted intermodal container is being shipped to a deployment destination, because there are no extraneous leads on the outside of the container, it means the container is still of standard intermodal container height and therefore can be transported with other standardized containers. Moreover, the utility cable housings enable easy deployment of converted intermodal container tanks in a concatenated train for larger installations.

A suspension assembly can alternatively be configured as a heavier duty structure to suspend heavier processing equipment within the tank. However, for heavy equipment which may be subjected to vibration and dynamic loads during shipping, a different support arrangement is preferred in which a compressive force is applied down through the support assembly so that the anchor point at the top wall is supplemented by a pressure engagement between the support assembly and the floor of the lined container.

One such support arrangement is illustrated in FIGS. 18-20. The arrangement includes roof-mounted suspension assemblies as illustrated in FIGS. 12 to 17 together with several pairs of jack posts 108, each post being fixed to a respective suspension assembly. The posts of each pair are spaced across the width of the reinforced container and the pairs may be distributed along the length of the container depending on where processing equipment is to be supported. The height of each post 108 is adjustable at a screw mechanism 110. To protect the liner, bars 112 and 114 are located at the top and bottom respectively of the jack posts and extend across the container tank. Each top and bottom bar 112, 114 is positioned over a deformable neoprene spacer 116, and each top bar 112 is screwed to one of the joists 88. The jack posts 108 and the bars 114, 116 provide a means for mounting cross brackets, such as brackets 118 at the top of the container and brackets 119 at the bottom of the container. Alternative support brackets arrangements may hang directly off the jack posts and be configured and located to support any of various utilities or process components at desired heights in the container. The jack post arrangement provides a stable support/suspension mechanism with the bars 112, 114 and the neoprene spacers 116 protect the integrity of the relatively fragile liner. The utilities and process components supported by the support arrangement may have elements that are routed through the container tank either above the design level of water to be stored/processed in the tank or below the design level. As an example, FIG. 20 shows a pipe 120 mounted near the bottom of the container, the pipe 120 clamped to the brackets 119 by U-bolts 117 and having a series of associated air diffusers 122. In some circumstances, one or more of the pairs of jack posts can be replaced by a single jack post located near the center line of the container.

An alternative embodiment of support arrangement is shown in FIGS. 21-24. A lower part of the support assembly as shown in FIGS. 23, 24 has vertical posts 107 and laterals 109 formed of U-channel unistrut. The vertical posts 107 are bolted to angle brackets 111 which are mounted to the bottom of suspension assemblies 124. At the bottom of the support assemblies, a pair of sturdy molded plastic stools 113 stand on the liner 98 on the tank floor. The stools are fixed at lower brackets 115 to the unistrut laterals 109. The laterals extend across the width of the tank but have their ends spaced from the sidewalls so as to minimize risk of the unistrut damaging the sidewall liner sections. It will be seen that in this heavier duty arrangement, while the same top anchor arrangement is used, the support assemblies bear at multiple locations against the floor of the container tank to provide greater stability for processing units to be supported in the tank interior.

Figure 25:
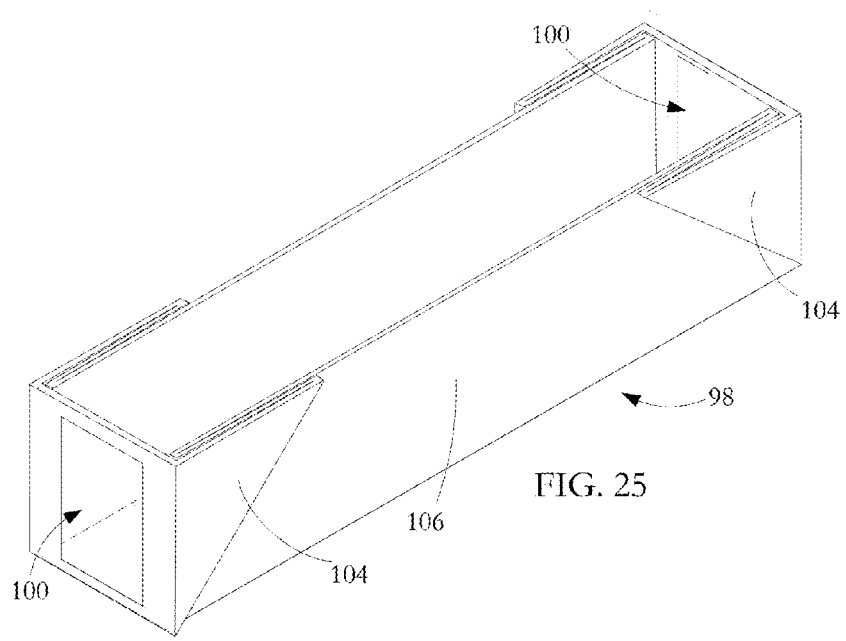
FIG. 25 is an isometric view of a flexible liner according to an embodiment of the invention, the liner for use in a reinforced intermodal container.

The reinforced intermodal container with a suitable component support arrangement is adapted for use in containing and processing wastewater or other liquid using a flexible liner in the interior of the container. The liner has a liner tub part 98 within which water to be treated is to be contained when the tank is in use. An exemplary form of liner tub part 98 is illustrated in FIG. 25 and is used to make the interior of the reinforced container watertight. A suitable material for the liner is reinforced polypropylene. The liner is 45 mil thick and weighs about 300 lb. This material offers good breaking and tearing strength. The liner material also has good water vapour permeance, hydrostatic resistance, puncture resistance, ozone resistance, resistance to linear shrinkage, resistance to water absorption, and breaking and tearing strengths. The liner 98 is preformed into a tailored box form as illustrated in FIG. 25 and then inserted through the front access hatch 68 in the process wall 64 and manipulated into positioned against the interior surface of the container tank.

Figure 26:
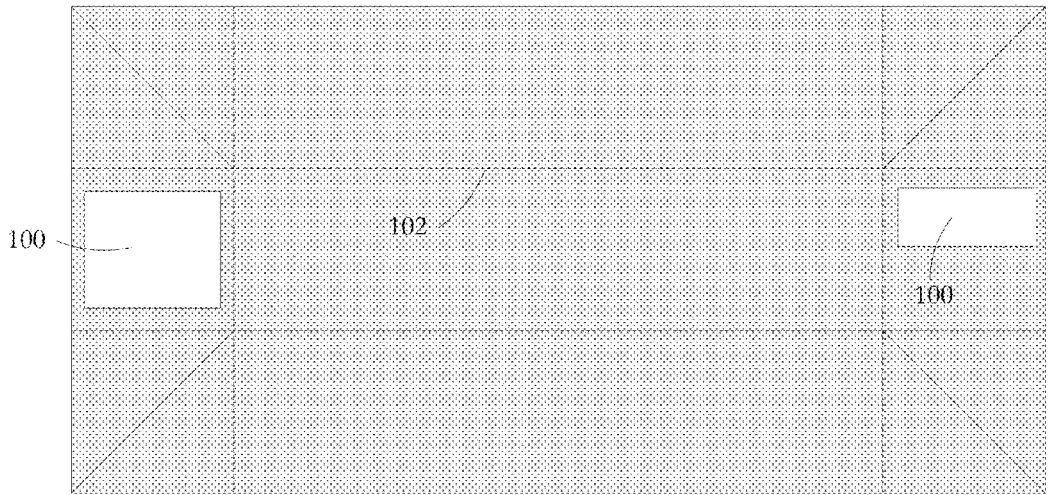
FIG. 26 is a plan view of a stock flexible liner material blank for use in making the liner of FIG. 25.

As shown in FIG. 26, the liner tub part 98 is formed from a rectangle of stock material. For a typical liner tub part, the rectangle is of the order of 28 feet wide by 55 feet long. This may require factory installed seams between narrower lengths of stock material. The rectangle of stock material is cut to form apertures 100 for the front and rear process walls. The material is folded upwardly from a base section at lines 102 where the material has previously been tooled to facilitate and localize folding. Excess material at each corner is formed as an envelope fold 104 which is folded back along the outer sides 106 of the box form and sealed against them. Although not shown in FIG. 26, at the top of the box liner, an upper marginal part is similarly folded back to produce smaller envelope folds at each top corner which are similarly sealed against the liner box sides. The structure is of particular value in the context of water containment in a reinforced modal container because, at the time of installation, there is no requirement for field or hand sealed seams to be made in the liner tub part.

Figure 27:
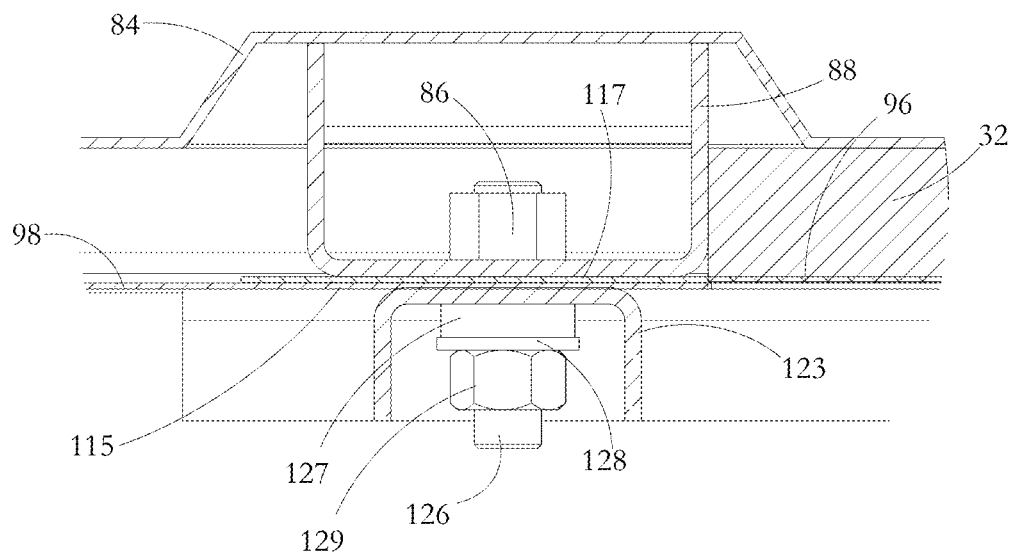
FIG. 27 is a detail sectional view showing a join configuration between a liner tub part and a liner cap part, the liner parts together forming a liner for a converted intermodal container according to an embodiment of the invention.
Figure 28:
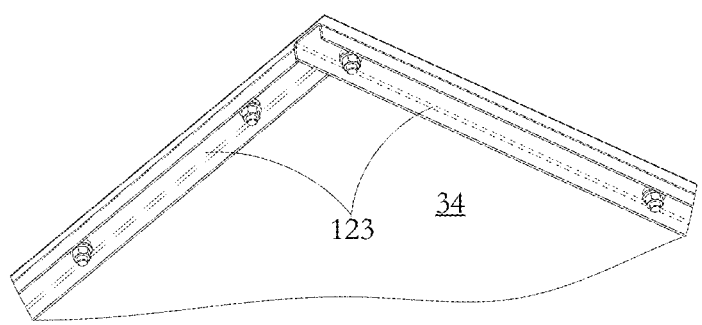
FIG. 28 is detail isometric view from below of the join configuration of FIG. 27

To install the preformed liner tub part 98, it is folded out on the floor of the container after welding and protective painting of the modified front and back walls is completed and after an optional inch thick layer 32 of polystyrene insulation has been attached by adhesive over the complete interior of the container tank with foam rated adhesive to secure it to the underlying metal walls. The container tank sidewalls are coated with adhesive and the liner tub part 98 is pressed against the sidewalls to locate it in position. Once the liner tub part 98 is fixed in position, portions surrounding the apertures 100 at the container tank ends are positioned over the process wall flanges 76 in preparation for closing off the ends of the liner by installation of the process wall 64. At the top of the container tank, as shown in FIG. 27, a liner cap part 96, cut to a size slightly smaller than the area of the top container wall is stuck against the top wall using adhesive. The liner tub part 98 has an upper section which is folded inwardly at the top of the tank so that a marginal portion 115 overlaps a marginal portion of the liner cap part 117. Parts of the overlapping margins 115, 117 are located on reinforcing bars 88 at the site of nuts 86. At these sites, the overlapping margins 115, 117 are punctured and threaded studs 127 are screwed into the underlying threaded apertures. Caulking compound 121 is applied between the overlapping margins 115, 117 and an angle bar 123 is bolted over the join between the liner parts to provide a seal extending the full length of the overlap. It is important that the seal between the two liner sections is watertight because any escape of liquid along the seam could permeate behind the liner 96, 98 and cause the walls 6, 8 and the roof 12 to rust and deteriorate and cause water to collect and pool as a result of condensation. To this end, the inside diameter of a gasket 127 is a friction fit on the outer diameter of the bolt 126 so that when nut 129 is tightened against washer 128, gasket 127 is squeezed to decrease the inner diameter of the gasket and to seal it around the threads of bolt 126. This ensures that moisture and condensation inside the tank cannot leak through the hole in the liner parts and condense on the upper side of the liner. Similar gasket arrangements are used over the rest of the liner cap part but without using the angle bar 123.

Other variations and modifications will be apparent to those skilled in the art. The embodiments of the invention described and illustrated are not intended to be limiting. The principles of the invention contemplate many alternatives having advantages and properties evident in the exemplary embodiments.

What is claimed is:

1. An intermodal container having a roof, a floor, side walls and a first end wall, the container converted for use as a tank for processing water with the roof, floor, side walls and first end wall forming a roof, floor, side walls and one end wall of a tank, the tank having another end wall opposed to said one end wall and fixed to the container side walls, the tank walls reinforced to enable the tank to hold water, a flexible liner tub part for containing water to be processed, the liner tub part supported by the floor and mounted against the tank walls and having a margin at a top edge thereof, and a liner cap part mounted to the roof and having a margin at an edge thereof, one of the liner tub part and the liner cap part overlapping and sealed to the other of the liner tub part and liner cap part at the margins.

2. A container as claimed in claim 1, further comprising reinforcing members adjacent the container roof, the reinforcing members having first fixtures therein for suspending items in the interior of the container tank, the liner cap part attached to the roof at a plurality of the first fixtures.

3. A container as claimed in claim 2, the liner cap part attached at said roof by a plurality of second fixtures engaging respective ones of the first fixtures, the second fixtures each including a gasket assembly to prevent access to the engaged fixtures by water and vapor from the interior of the tank.

4. A container as claimed in claim 1, the container roof of corrugated form, the corrugations having outboard panels and inboard panels joined by web portions, the reinforcing members being angle bars welded to the interior of the container adjacent the roof and extending across the container.

5. A container as claimed in claim 4, further comprising an insulating layer extending over the inside of the container walls, the reinforcing members at the roof exposed through the insulating layer.

6. A container as claimed in claim 1, the liner tub part formed from a single sheet of liner material by folding for fitment at junction lines between the tank floor and the tank walls and by folding with envelope folds for fitment at lower corners between adjacent walls.

7. A container as claimed in claim 6, the liner cap part formed from a single sheet of liner material by folding for fitment at junction lines between the tank roof and the tank walls and by folding with envelope folds for fitment at upper corners between adjacent tank walls.

8. A container as claimed in claim 1, the material of the liner tub part foldable to allow access to and from the interior of the tank via a hatch in one of the tank walls.

9. A container as claimed in claim 1, the liner tub part draped against the tank walls and fixed thereto by adhesive.

10. A container as claimed in claim 1, the liner tub part made of reinforced polypropylene.

11. A container as claimed in claim 1, the liner cap part being a flexible liner cap part.

\* \* \* \* \*